US009829372B2

United States Patent
Hayes

(10) Patent No.: US 9,829,372 B2
(45) Date of Patent: Nov. 28, 2017

(54) METHOD AND APPARATUS FOR DETERMINING IF A SHIPMENT UNDERGOES EXCESSIVE VIBRATION

(71) Applicant: SYMBOL TECHNOLOGIES, LLC, Lincolnshire, IL (US)

(72) Inventor: Matthew B Hayes, Wheaton, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 618 days.

(21) Appl. No.: 14/471,033

(22) Filed: Aug. 28, 2014

(65) Prior Publication Data

US 2016/0061649 A1    Mar. 3, 2016

(51) Int. Cl.
*G01H 1/00* (2006.01)
*G01P 15/00* (2006.01)

(52) U.S. Cl.
CPC .............. *G01H 1/00* (2013.01); *G01P 15/00* (2013.01)

(58) Field of Classification Search
CPC .................. G01H 1/00; G01P 15/00
See application file for complete search history.

(56) References Cited

U.S. PATENT DOCUMENTS

| | | | |
|---|---|---|---|
| 4,284,013 A | 8/1981 | Davidson | |
| 6,237,795 B1 | 5/2001 | Buckley et al. | |
| 7,277,009 B2 | 10/2007 | Hall et al. | |
| 7,535,355 B2 | 5/2009 | Barone | |
| 7,714,708 B2 | 5/2010 | Brackmann et al. | |
| 2002/0120475 A1 | 8/2002 | Morimoto | |
| 2005/0171738 A1* | 8/2005 | Kadaba | G06K 19/0717 702/187 |
| 2009/0146805 A1 | 6/2009 | Joao | |
| 2013/0030725 A1* | 1/2013 | Friedlander | G01H 1/12 702/56 |
| 2015/0254600 A1* | 9/2015 | Murthy | G06Q 10/083 705/337 |

\* cited by examiner

*Primary Examiner* — Paul D Lee
*Assistant Examiner* — Mark Crohn

(57) ABSTRACT

A method and apparatus for determining when a shipment undergoes excessive vibration or bouncing is provided herein. During operation, a device such as an accelerometer, Piezoelectric, or vibration sensor, will monitor an acceleration/vibration experienced by a shipment. The device will also monitor an acceleration/vibration experienced by the shipping container housing/holding the shipment. If the acceleration or vibration of the shipment exceeds the acceleration or vibration of the shipping container by a predetermined amount, a warning will be given so that the situation can be mitigated.

12 Claims, 3 Drawing Sheets

US 9,829,372 B2

METHOD AND APPARATUS FOR DETERMINING IF A SHIPMENT UNDERGOES EXCESSIVE VIBRATION

FIELD OF THE INVENTION

The present invention generally relates to monitoring shipments/packages being shipped, and more particularly, to a method and apparatus for determining if a shipment undergoes excessive vibration.

BACKGROUND OF THE INVENTION

The shipping industry accounts for billions of dollars in revenues annually. In recent years, the growth of electronic commerce and electronic retailers has only increased the need for shipping, delivery, and/or freight delivery. All too often shipped items are damaged during the shipping process. Many times the damage happens because the shipping container/package is not placed on a trailer or shipping container correctly, and undergoes excessive vibration or bouncing. An effective way to identify when this is happening is needed so that the situation can be mitigated.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages, all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary, in a commercially feasible embodiment, are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for determining when a shipment undergoes excessive vibration or bouncing is provided herein. During operation, a device such as an accelerometer, Piezoelectric, or vibration sensor, will monitor an acceleration/vibration experienced by a shipment. The device will also monitor an acceleration/vibration experienced by the shipping container housing/holding the shipment. If the acceleration or vibration of the shipment exceeds the acceleration or vibration of the shipping container by a predetermined amount, a warning will be given so that the situation can be mitigated.

As an example of the above, consider a simple package (shipment) placed into a delivery truck (shipping container). If the shipment is not placed on the delivery truck correctly, it could undergo excessive acceleration, vibration, or bouncing. When the shipment is experiencing a vibration much above what the truck is experiencing, the driver of the truck will be provided with a warning so that the shipment can be better secured.

It should be noted that the acceleration or vibration experienced by the shipment and the truck are compared during a same period of time, so, for example, as the shipping vessel goes over, for example, a bump in the road, a warning will not be provided unless the acceleration or vibration of the shipment exceeds that of the truck.

The above-described technique results in an acceleration or vibration of a first item being monitored. An acceleration or vibration of a second item is also monitored. The second item comprises a container, vessel, pallet, box, . . . , etc. that is holding, housing, or transporting the first item. When the acceleration or vibration experienced by the first item greatly exceeds an acceleration or vibration experienced by the second item (e.g., >1 g), at a same point in time, a warning will be provided. This is illustrated in FIG. 1 and FIG. 2.

Figure 1:
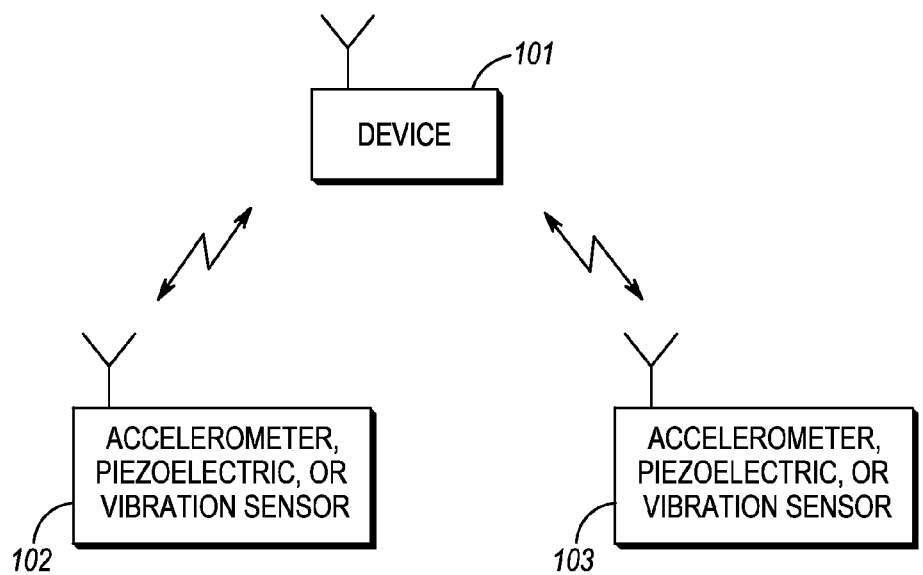
FIG. 1 is a block diagram of a device that determines if a shipping container has undergone excessive vibration.
Figure 2:
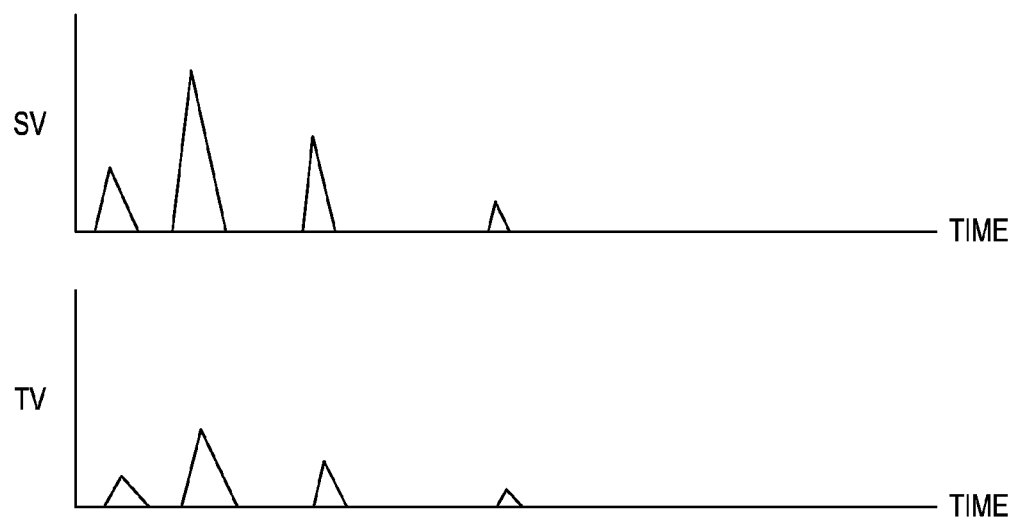
FIG. 2 illustrates instantaneous accelerations of various accelerometers.

As shown in FIG. 1, first accelerometer 102 and second accelerometer 103 provide acceleration or vibration data to device 101. Although FIG. 1 accelerometers 102 and 103 that determine excessive vibration or acceleration, in alternate embodiments any device that determines an acceleration and/or vibration may be utilized. For example, a piezoelectric crystal or vibration sensor may be substituted for each accelerometer in FIG. 1.

Accelerometers 102 and 103 are shown providing device 101 with acceleration or vibration data via a wireless transmission of data, however, one of ordinary skill in the art will recognize that elements 101, 102 and 103 may be hard wired. Accelerometers preferably comprise of components that fundamentally sense movement and converts mechanical acceleration or vibration into electrical signals, for example accelerometer available from Texas Instruments.

During operation, device 101 will receive data from first accelerometer 102 and from second accelerometer 103. Device 101 will compare acceleration or vibration data to determine a difference between the two at any given point in time. Assuming that accelerometer 102 is attached to a shipment, and accelerometer 103 is attached to a shipping trailer, container, or pallet holding the shipment, then if the acceleration or vibration experienced by accelerometer 102 (SV) is equal to the acceleration or vibration experienced by accelerometer 103 (TV) at any point in time, then it can be assumed that there is no increase or decrease in forces experienced on the shipment due to a poor loading procedure. If SV<TV then it can be assumed that the loading technique has actually decreased vibration during the shipping process. Finally, if SV>TV, then it can be assumed that the shipment is experiencing increased forces which may be due to the way the shipment has been loaded. If SV>TV by a predetermined amount, then a warning may be provided by device 101.

As shown in FIG. 2, SV and TV are provided to device over a period of time. At various points in time, both the shipping container and the shipping vessel (e.g., a truck) will experience instantaneous acceleration or vibrations due to, for example, bumps in the road travelled on during the shipping process. In FIG. 2, it can be seen that at various points in time SV exceeds TV in magnitude. If device 101 detects this, and if SV-TV>threshold, then device 101 may warn a user of this situation. The user is preferably warned by an audible alarm and a visible indication of what shipment is having the potential problem.

Although FIG. 1 and FIG. 2 show two accelerometers, in actuality each shipment within a shipping vessel may be monitored as described above. Therefore it is envisioned that device 101 could monitor hundreds, if not thousands of shipments for acceleration or vibration data and comparing these data to the acceleration or vibration experienced by the vessel or container shipping the shipments. An alarm may sound if any shipment experiences excessive acceleration or vibration beyond that experienced by the vessel or container shipping the shipments.

Figure 3:
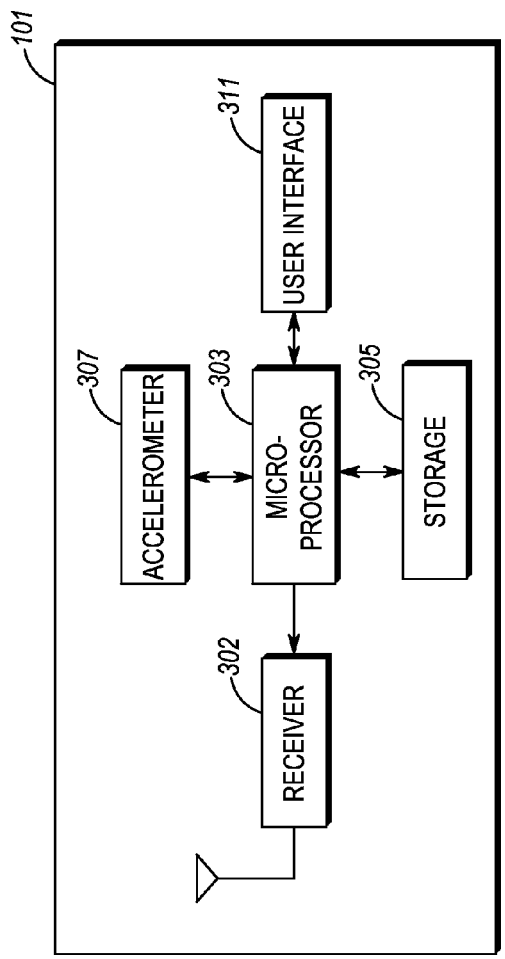
FIG. 3 is a more-detailed block diagram of the device of FIG. 1.
Figure 3:
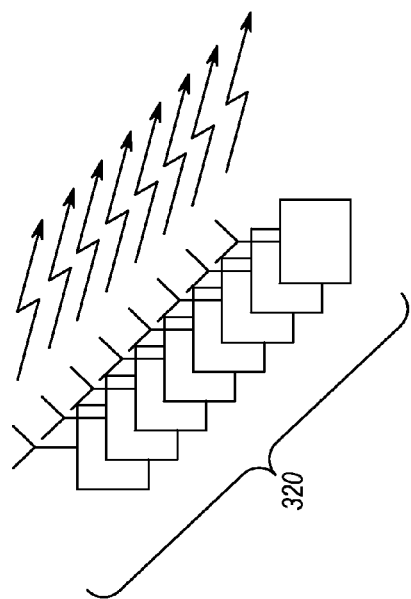

FIG. 3 is a more-detailed block diagram of the device of FIG. 1. Device 101 typically comprises logic circuitry/processor 303 that is communicatively coupled with various system components such as, but not limited to, receiver 302, general storage component 305, accelerometer 307, and potentially, a user interface (GUI) 311. Only a limited number of system elements are shown for ease of illustration; but additional such elements may be included in the device 101.

Figure 4:
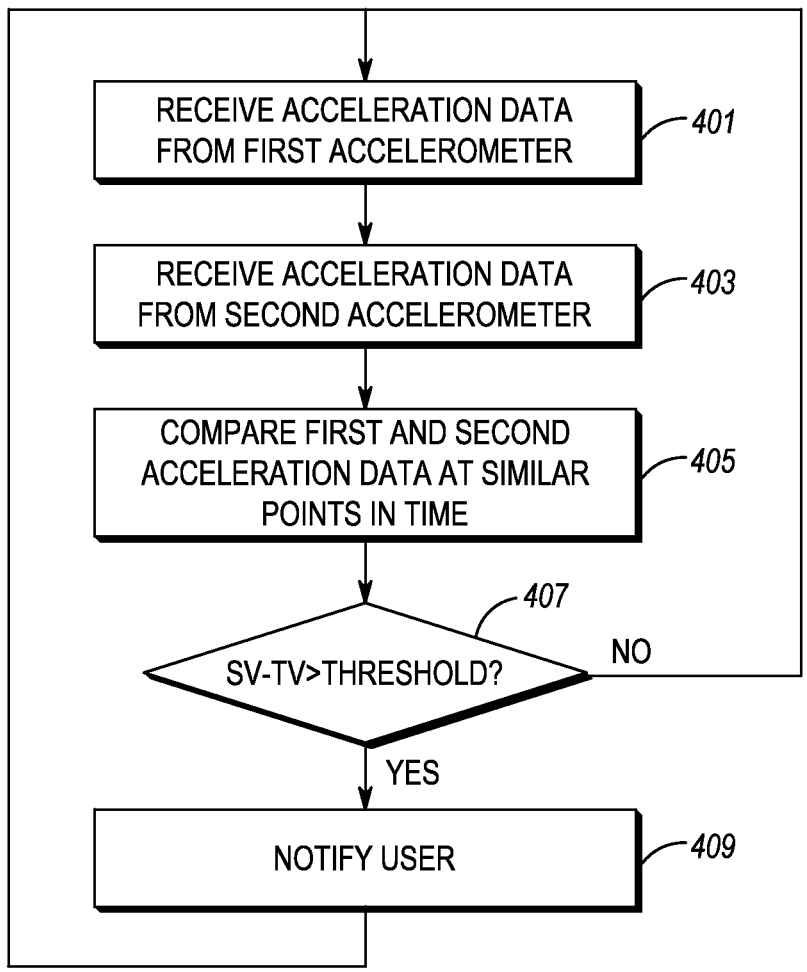
FIG. 4 is a flow chart showing operation of the device of FIG. 3.

Processing device 303 may be partially implemented in hardware and, thereby, programmed with software or firmware logic or code for performing functionality described in FIG. 4; and/or the processing device 303 may be completely implemented in hardware, for example, as a state machine or ASIC (application specific integrated circuit). Storage 305 can include short-term and/or long-term storage of, for example, acceleration or vibration data experienced by any accelerometer. Storage 305 may further store software or firmware for programming the processing device 303 with the logic or code needed to perform its functionality.

User interface provides a way of conveying (e.g., via text, video, or audio means) information to the user. In particular, in an embodiment, acceleration or vibration data may be displayed to the user along with shipment identification information. This information may comprise information such as "3 lb. shipment addressed to Mr. Smith is experiencing excessive acceleration or vibration". In order to provide the above features (and additional features), user interface 311 may include a keypad, a display/monitor, a mouse/pointing means, and/or various other hardware components to provide a man/machine interface.

Receiver 302 is common circuitry known in the art for communication utilizing a well known communication protocol, and serve as means receiving identification information and acceleration or vibration data from multiple accelerometers 320 on multiple shipments. Thus, a particular accelerometer 320 may transmit acceleration or vibration data along with an identification of the shipment affixed to a particular accelerometer 320. Receiver 302 may be well known short-range receiver that utilize the IEEE 802.11 communication system protocol, Bluetooth, HyperLAN protocols, or any other communication system protocol.

In a preferred embodiment processor 303 receives acceleration or vibration data from accelerometers 320 along with the acceleration or vibration data, processor receives identification information so that a particular accelerometer 320 may be associated with a particular shipment in which the accelerometer 320 is affixed. The acceleration or vibration data received from accelerometers 320 is compared to acceleration or vibration data received from accelerometer 307. All acceleration or vibration data may be stored in storage 305 for future analysis. It should be noted that accelerometer 307 should be positioned in a way to measure acceleration or vibration data from a vessel, crate, or cargo container that is shipping shipments affixed with accelerometers 320. Although FIG. 3 shows accelerometer 307 internal to device 101, in an alternate embodiment of the present invention accelerometer 307 may exist external to device 101, and provide acceleration or vibration data to device 101 via a wireless data transfer.

If any accelerometer 320 has an acceleration or vibration that exceeds that of accelerometer 307 by a predetermined amount, then logic circuitry 303 will utilize user interface 311 to notify the user of such.

FIG. 4 is a flow chart showing operation of the device of FIG. 3. The logic flow begins at step 401 where logic circuitry 303 receives at least first acceleration or vibration data (SV) from a first accelerometer. Along with the first acceleration or vibration data, shipment ID information may be obtained. The ID information may simply comprise a name and address of the recipient of the shipment in which the accelerometer is affixed. The first acceleration or vibration data preferably comprises acceleration or vibration data from an accelerometer attached to a shipment currently being shipped by a shipping vessel. At step 403, logic circuitry 303 receives acceleration or vibration data from a second accelerometer. The second accelerometer data comprises acceleration or vibration data for the shipping vessel (TV).

At step 405 the first and the second acceleration or vibration data are compared at similar points in time and it is determined if at a point in time SV-TV>threshold (step 407). If not, the logic flow returns to step 401. If, however at step 407 it is determined that SV-TV>threshold, then the logic flow continues to step 409 where logic circuitry 303 instructs user interface 311 to provide a notification to a user that the threshold has been exceeded along with identification information for the shipment.

The above technique provides for a method that receives at a receiver, first acceleration or vibration data (SV) from a first accelerometer and second acceleration or vibration (TV) data from a second accelerometer. The first and the second acceleration or vibration data are compared at similar points in time. It is determined if SV-TV>threshold, and if so, a user is notified that a shipment is undergoing excessive vibration.

As discussed above, the first accelerometer is affixed to a shipment, crate, or pallet, while the second accelerometer is affixed to a vessel housing the shipment, crate, or pallet. Additionally identification data from the first accelerometer may be received and the user may be notified of the identification of the shipment undergoing excessive vibration.

An apparatus is also provided that comprises a receiver receiving first acceleration or vibration data (SV) from a first accelerometer and receiving second acceleration or vibration (TV) data from a second accelerometer. Logic circuitry compares the first and the second acceleration or vibration data at similar points in time, and determines that SV-TV>threshold. Finally, a user interface is provided that notifies a user that a shipment is undergoing excessive vibration based on the determination that SV-TV>threshold.

In the foregoing specification, specific embodiments have been described. However, one of ordinary skill in the art appreciates that various modifications and changes can be made without departing from the scope of the invention as set forth in the claims below. For example, the above technique may be utilized to determine whether specific shipment loading factors (such as human trailer loader, shipment type, packaging type) are consistently causing excessive vibration. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on a general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of detecting improper loading of a shipment in a shipping container, the method comprising:
   receiving, first data from a first accelerometer carried by the shipment, the first data indicative of a first amount of vibration of the shipment at a time;
   receiving, second data from a second accelerometer carried by the shipping container, the second data indicative of a second amount of vibration of the shipping container at the time;
   determining, using a logic circuit, a difference between the first amount of vibration and the second amount of vibration;
   comparing, using the logic circuit, the difference to a threshold;
   when the difference is greater than a threshold, generating a notification that the shipment is improperly loaded in the shipping container.

2. The method of claim 1 wherein the first accelerometer is affixed to the shipment.

3. The method of claim 1 wherein the second accelerometer is affixed to the shipping container.

4. The method of claim 1 further comprising:

receiving identification data from the first accelerometer; and generating identifying information corresponding the shipment to accompany the notification.

5. The method of claim 1 further comprising:

receiving identification data from the second accelerometer; and generating identifying information corresponding to the shipping container to accompany the notification.

6. The method of claim 1, further comprising, when the difference is less than or equal to the threshold, determining that the shipment is properly loaded in the shipping container.

7. An apparatus configured to detect improper loading of a shipment in a shipping container, the apparatus comprising:

a receiver configured to receive:

first data from a first accelerometer carried by the shipment, the first data indicative of first amount of vibration experienced by the shipment at a time; and second data from a second accelerometer carried by the shipping container, the second data indicative of a second amount of vibration experienced by the shipping container at the time;

logic circuitry configured to:
determine a difference between the first amount of vibration and the second amount of vibration;
compare the difference to a threshold; and a user interface configured to generate a notification that the shipment is improperly loaded in response to the logic circuitry determining that the difference is greater than the threshold.

8. The apparatus of claim 7 wherein the first accelerometer is affixed to the shipment.

9. The apparatus of claim 7 wherein the second accelerometer is affixed to the shipping container.

10. The apparatus of claim 7, wherein:
the receiver is configured to receive identification data from the first accelerometer; and
the user interface is configured to provide identifying information corresponding to the shipment to accompany the notification.

11. The apparatus of claim 7, wherein:
the receiver is configured to receive identification data from the second accelerometer; and
the user interface is configured to provide identifying information corresponding to the shipping container to accompany the notification.

12. The apparatus of claim 7, wherein the logic circuitry is configured to, when the difference is less than or equal to the threshold, determine that the shipment is properly loaded in the shipping container.

* * * * *